(12) United States Patent
Skachkov et al.

(10) Patent No.: US 12,491,469 B2
(45) Date of Patent: Dec. 9, 2025

(54) SCREW CONVEYOR ADSORPTION MOVING BED WITH HEAT INTEGRATION

(71) Applicant: Schlumberger Technology Corporation, Sugar Land, TX (US)

(72) Inventors: Roman Alexandrovich Skachkov, Cambridge, MA (US); Shahnawaz Hossain Molla, Cambridge, MA (US); Davuluri Prahlada Rao, Hyderabad (IN); Sandeep Verma, Cambridge, MA (US); Bruno Lecerf, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/775,229

(22) Filed: Jul. 17, 2024

(65) Prior Publication Data
US 2025/0025826 A1 Jan. 23, 2025

Related U.S. Application Data

(60) Provisional application No. 63/611,241, filed on Dec. 18, 2023, provisional application No. 63/513,923, filed on Jul. 17, 2023.

(51) Int. Cl.
*B01D 53/02* (2006.01)
*B01D 53/06* (2006.01)
*B01D 53/62* (2006.01)

(52) U.S. Cl.
CPC .............. *B01D 53/06* (2013.01); *B01D 53/62* (2013.01); *B01D 2253/10* (2013.01);
(Continued)

(58) Field of Classification Search
CPC .......... B01D 2253/10; B01D 2253/204; B01D 2257/504; B01D 2259/4009; B01D 53/06; B01D 53/62; Y02C 20/40
See application file for complete search history.

(56) References Cited

U.S. PATENT DOCUMENTS 4,788,701 A * 11/1988 Barrett ..................... G21K 5/10
378/68
5,589,599 A * 12/1996 McMullen .............. C10B 53/00
210/769
(Continued)

FOREIGN PATENT DOCUMENTS

CN 110691638 A 1/2020
CN 106563428 B 7/2020
(Continued)

OTHER PUBLICATIONS

Kim, K. et al., "Moving bed adsorption process with internal heat integration for carbon dioxide capture", International Journal of Greenhouse Gas Control, 2013, 17, pp. 13-24.
(Continued)

*Primary Examiner* — Christopher P Jones
(74) *Attorney, Agent, or Firm* — Jeffrey D. Frantz

(57) ABSTRACT

Systems and methods presented herein provide for a screw conveyor adsorption moving bed that separates carbon dioxide from a gas mixture. Adsorbent particles are transported between an adsorption section of the reactor, which can be an outer column, and a desorption section, which can be an inner column. The particle transport is facilitated by the screw conveyor located inside the inner column. The screw conveyor is specially designed to have a hollow screw, shaped as a spiral surface, attached to a central shaft. The screw surface is also equipped with plurality of holes and a flexible edge attachment to seal against the cylindrical surface. The hollow shape allows the gas to flow from the inlet of the shaft to the particles through the holes on the screw, thus creating uniform gas distribution.

20 Claims, 2 Drawing Sheets

(52) U.S. Cl.
CPC .. *B01D 2253/204* (2013.01); *B01D 2257/504* (2013.01); *B01D 2259/4009* (2013.01)

(56) References Cited

U.S. PATENT DOCUMENTS

| | | | |
|---|---|---|---|
| 5,946,816 A * | 9/1999 | Smith | F26B 21/083 |
| | | | 34/216 |
| 7,594,956 B2 | 9/2009 | Knaebel | |
| 8,715,394 B2 | 5/2014 | Caram | |
| 9,073,004 B2 | 7/2015 | Ogino | |
| 9,527,029 B2 * | 12/2016 | Elliott | B01D 53/06 |
| 2011/0005395 A1 * | 1/2011 | Vimalchand | B01D 53/08 |
| | | | 96/146 |
| 2013/0305923 A1 * | 11/2013 | Wardhaugh | B01D 3/08 |
| | | | 95/151 |
| 2015/0007726 A1 * | 1/2015 | Elliott | B01D 53/06 |
| | | | 95/139 |
| 2016/0175760 A1 | 6/2016 | Sadler | |
| 2021/0187438 A1 | 6/2021 | Nishibe | |
| 2023/0133498 A1 * | 5/2023 | Jin | F27B 17/0016 |
| | | | 34/247 |
| 2023/0183582 A1 * | 6/2023 | Basha | C10G 11/18 |
| | | | 585/241 |
| 2025/0025827 A1 | 1/2025 | Skachkov et al. | |

FOREIGN PATENT DOCUMENTS

| | | |
|---|---|---|
| CN | 112312993 A | 2/2021 |
| JP | 4354788 B2 | 10/2009 |
| JP | 4986822 B2 | 7/2012 |
| JP | 5449187 B2 | 3/2014 |
| JP | 5529374 B2 | 6/2014 |
| KR | 100949525 B1 | 3/2010 |
| KR | 20120091156 A | 8/2012 |
| KR | 101263363 B1 | 5/2013 |
| KR | 20140077466 A | 6/2014 |
| KR | 20200063223 A | 6/2020 |
| SU | 1223974 A1 | 4/1986 |
| TW | 201141598 A | 12/2011 |
| WO | 2022043050 A1 | 3/2022 |

OTHER PUBLICATIONS

Mondino, G. et al., "Evalutation of MBTSA technology for CO2 capture from waste-to-energy plants", International Journal of Greenhouse Gas Control, 2022, 118, 103685, 17 pages.

* cited by examiner

SCREW CONVEYOR ADSORPTION MOVING BED WITH HEAT INTEGRATION

CROSS-REFERENCE TO RELATED APPLICATION

The present disclosure claims priority from U.S. Provisional Application No. 63/513,923, filed Jul. 17, 2023, entitled "SCREW CONVEYOR ADSORPTION MOVING BED WITH HEAT INTEGRATION", and U.S. Provisional Application No. 63/611,241, filed Dec. 18, 2023, entitled "SCREW CONVEYOR ADSORPTION MOVING BED WITH HEAT INTEGRATION", both of which are herein incorporated by reference in their entirety.

BACKGROUND

Carbon dioxide ($CO_2$) can be a byproduct of many industrial processes. For environmental and other concerns, there is often a need to capture and manage the $CO_2$ output. As one example, $CO_2$ injection can enhance oil recovery, increasing the amount of oil that is extracted from a reservoir. $CO_2$ can lower the viscosity of the oil and make it easier to extract. The $CO_2$ also helps to displace the oil from the reservoir and push it towards the production well. However, it is often desirable to eventually separate injected $CO_2$ from a gas mixture.

Left unabated, the $CO_2$ can have both environmental impacts as well as functional impacts on the well. For example, in the context of oil wells, $CO_2$ can cause several different problems. One problem is corrosion. $CO_2$ can dissolve in water to form carbonic acid, which can cause corrosion of metal surfaces in oil wells, including pipes and other equipment. This can lead to leaks and equipment failures. Another issue is reduced oil recovery. $CO_2$ can displace oil in reservoirs, making it more difficult to recover. This can result in decreased oil production and lower yields.

$CO_2$ can also lead to reduced reservoir pressure. $CO_2$ injection into oil wells to enhance oil recovery can result in reduced reservoir pressure, which can make it more difficult to recover oil and can also cause a decline in well productivity. Additionally, managing $CO_2$ in oil wells can be expensive, including the cost of monitoring and mitigating corrosion, managing reservoir pressure, and implementing $CO_2$ injection systems for enhanced oil recovery.

Overall, while $CO_2$ injection can be an effective method for enhanced oil recovery, it requires careful management to avoid negative impacts on oil well infrastructure and production.

New systems and methods are needed to separate $CO_2$ from a gas mixture, particularly within the context of oil wells.

SUMMARY

The examples described herein allow for separating $CO_2$ from a gas mixture. A screw conveyor adsorption moving bed ("SCAMB") can receive the gas mixture at an inlet. Adsorbent particles within the SCAMB can adsorb the $CO_2$.

In this design, the adsorbent particles are transported between the adsorption section of a reactor and the desorption section. The adsorption section can be an outer column that houses the desorption section as an inner column. Particle transport can be facilitated by a screw conveyor located inside the inner column. The screw conveyor can be specially designed to have a hollow screw, such as a spiral surface, attached to a central shaft.

The screw surface can be equipped with plurality of holes and a flexible edge attachment. This can allow the screw surface to seal against the inner cylindrical surface of the inner cylinder. The hollow shape allows the gas to flow from the inlet of the shaft to the particles through the holes on the screw, thus creating uniform gas distribution.

One novelty in this design is the moving particles also transfer heat between different sections of the reactor that are maintained at different temperatures. This feature allows users to recuperate unused thermal energy from the adsorber section and utilize the thermal energy in the desorber section. This effectively reduces the heating requirement in the adsorbent regeneration.

It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of this disclosure, illustrate various embodiments and aspects of the present invention. In the drawings.

DESCRIPTION OF THE EXAMPLES

Reference will now be made in detail to the present exemplary examples, including examples illustrated in the accompanying drawings. Wherever possible, the same reference numbers will be used throughout the drawings to refer to the same or like parts. The described examples are non-limiting.

Figure 1:
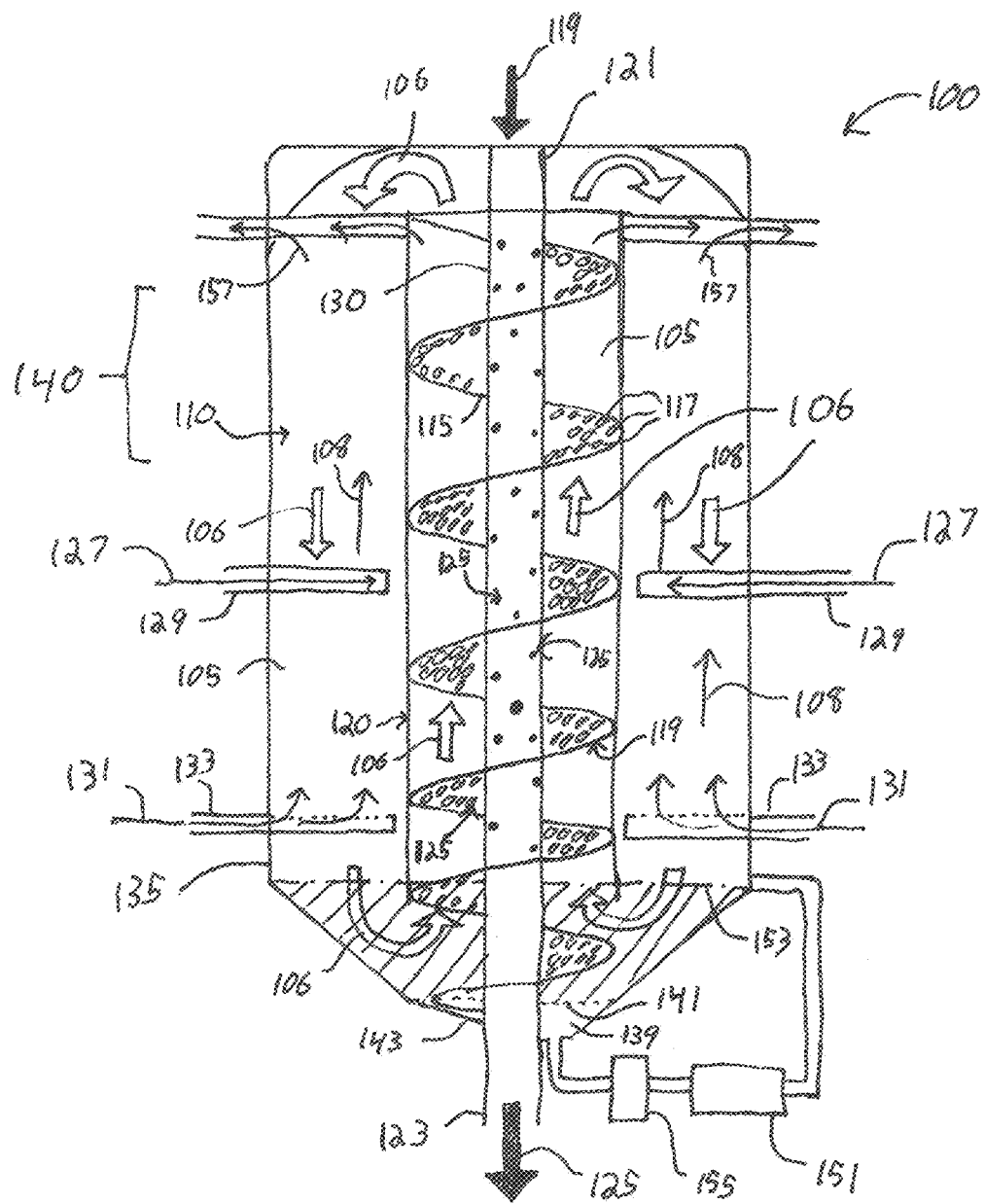
FIG. 1 is an example cross-sectional side-view illustration of a screw conveyor adsorption moving bed with heat integration.

FIG. 1 is an example cross-sectional side-view illustration of a screw conveyor adsorption moving bed with heat integration. The SCAMB 100 separates $CO_2$ from a gas mixture entering through the inlet by means of adsorption into the adsorbent particles 105. The adsorbent particles are transported between the adsorption section of the reactor, which is the outer column 110, and the desorption section, which is the inner column 120.

The particle transport is facilitated by the screw conveyor 140 located inside the inner column 120. The screw conveyor 140 can be specially designed to have a hollow screw 115 attached to a central shaft 130. The screw 115 surface can be equipped with plurality of holes 117 and a flexible edge attachment 119 to seal against the inner cylindrical surface of the inner cylinder 120. The screw 115 can be helical.

The hollow shape of the screw 115 allows the gas 119 to flow from the inlet 121 of the shaft 130 to the particles 105 through the holes 117 on the screw 115, thus creating uniform gas distribution. One novelty in this design is the moving particles can also transfer heat between different sections of the reactor that are maintained at different temperatures. This feature allows a system to recuperate unused thermal energy from the adsorption section 110 and utilize the recuperated unused thermal energy in the desorption section 120. This can reduce the heating requirement in the adsorbent regeneration.

The input of the shaft 130 can receive heated gas 119 for desorption. The heated gas for desorption at the inlet 121 may be pressurized greater than the outlet 123 for the heated gas to facilitate the desorption and flow of $CO_2$ 125 from the heated adsorbent particles. In some embodiments, a fan, blower, or pump provides the pressurized heated gas to the inlet 121 of the shaft 130. In some embodiments, a fan, blower, or pump (e.g., vacuum pump) coupled to the outlet 123 of the shaft 130 draws the heated gas 119 and desorbed $CO_2$ 125 through the shaft 130.

In one example, cooled recuperation gas 127 ($CO_2$-lean gas, mostly presented by $N_2$) from a heat exchanger can be fed into one or more inputs 129 into the outer column 110 (adsorption section). The adsorbent particles 105 can move downward in the outer column 110 being driven by gravity as shown by arrows 106. Meanwhile, gas movement can be upward as shown by arrows 108. Feed gas 131 ($CO_2$-rich gas) through inputs 133 can be positioned towards the bottom 135 of the outer column 110.

The bottom of the SCAMB 100 can be filled with sealing liquid 139 to prevent gas flow from the outer column 110 to the inner column 120. The sealing liquid 139 can include adsorbent particles 105. A sieve mesh 141 can separate the sealing liquid 139 from the adsorbent particles 105 and adsorbent powder, such that at the bottom 143 of the SCAMB 100 a liquid pump 151 can circulate the separated liquid back to the surface 153. An adsorbent powder is a result of adsorbent particle friction and the powder filter 155 can be placed in front of the liquid pump 151 to extract it from the circulating liquid 139, and a, therefore, pipeline for the cleaned liquid can take the pump output back to the surface 153. This bottom portion 143 of the SCAMB 100 can taper down towards the input to the powder filter 155 and liquid pump 151, with the sieve mesh 141 residing above the input. The liquid may be water, solvent, oil, or other liquid configured to inhibit flow of gas between the outer column 110 and the inner column 120.

Additionally, the inner column 120 can sink into the liquid below the surface 153 within the outer column 110 of the SCAMB 100. The screw 115 can begin below the opening to the inner column, and can be flexible. For example, the lower portion of the screw 115 can be rubber. The liquid surface 153 can be roughly even with the opening to the inner column 120 of the screw conveyor 140.

The screw can lift the adsorbent particles 105 into the inner column 120, raising the adsorbent particles 105 in an upward direction shown by arrows 106. Meanwhile, gas can move downward inside the inner column 120, passing through the holes in the screw 115 as shown by arrows 125.

A semi-closed hollow part of the screw shaft 130 can allow gas to flow out to the adsorbent particles 105 through the plurality of holes in the screw 115 as shown by arrows 125. A plurality of holes in the screw shaft 130 can also connect hollow parts of the shaft 130 and the screw 115.

Heated gas 119 can be applied to the hollow part of the shaft for desorption. Temperature swing adsorption ("TSA") is one type of desorption technique. In TSA, $CO_2$ is desorbed from a solid adsorbent material by raising the temperature of the material. This causes the adsorbed $CO_2$ more easily released from the material. When this happens, the desorbed $CO_2$ 125 can pass into the hollow portion of the shaft 130 and down through the output 123 at the bottom of the SCAMB 100.

Other desorption principles can be applied in the SCAMB as well. For example, a membrane separation can be utilized. The holes 117 in the screw or shaft can selectively permeate $CO_2$ in an example. The $CO_2$ can then be output from the shaft and collected.

With TSA, the system can heat the adsorbent material 105 to release the adsorbed $CO_2$. First, the adsorbent particles are exposed to a gas stream 131 containing $CO_2$. The $CO_2$ molecules adsorb into the adsorbent particles. The adsorbent particles can be part of a porous solid such as zeolite, activated carbon, or metal-organic frameworks ("MOFs").

In one example, after a certain amount of time, the adsorbent particles become saturated with $CO_2$, and the temperature of the adsorbent particles 105 can then be increased to a higher temperature, such as by passing a heating fluid through the adsorbent bed. The sealing liquid 139 can be heated for this purpose. This heating step can help initiate the desorption by increasing the temperature of the adsorbent particles 105.

In one example, the adsorption chamber of the outer cylinder 110 is maintained at a lower temperature than the desorption chamber of the inner cylinder 120.

Once the adsorbent particles 105 have been cooled, the temperature can then be raised again, such as by the heated gas 119 that passes through the shaft. The high temperature causes the $CO_2$ molecules to desorb from the adsorbent material and to be released into the gas stream 119 that exits from the outlet 123.

After desorption, the adsorbent particles oversleeping to the outer column. Thereby the adsorbent material is then ready to be used again for $CO_2$ adsorption, and the cycle can be repeated. Warm $CO_2$-lean gas 157 may be removed from the SCAMB 100

Figure 2:
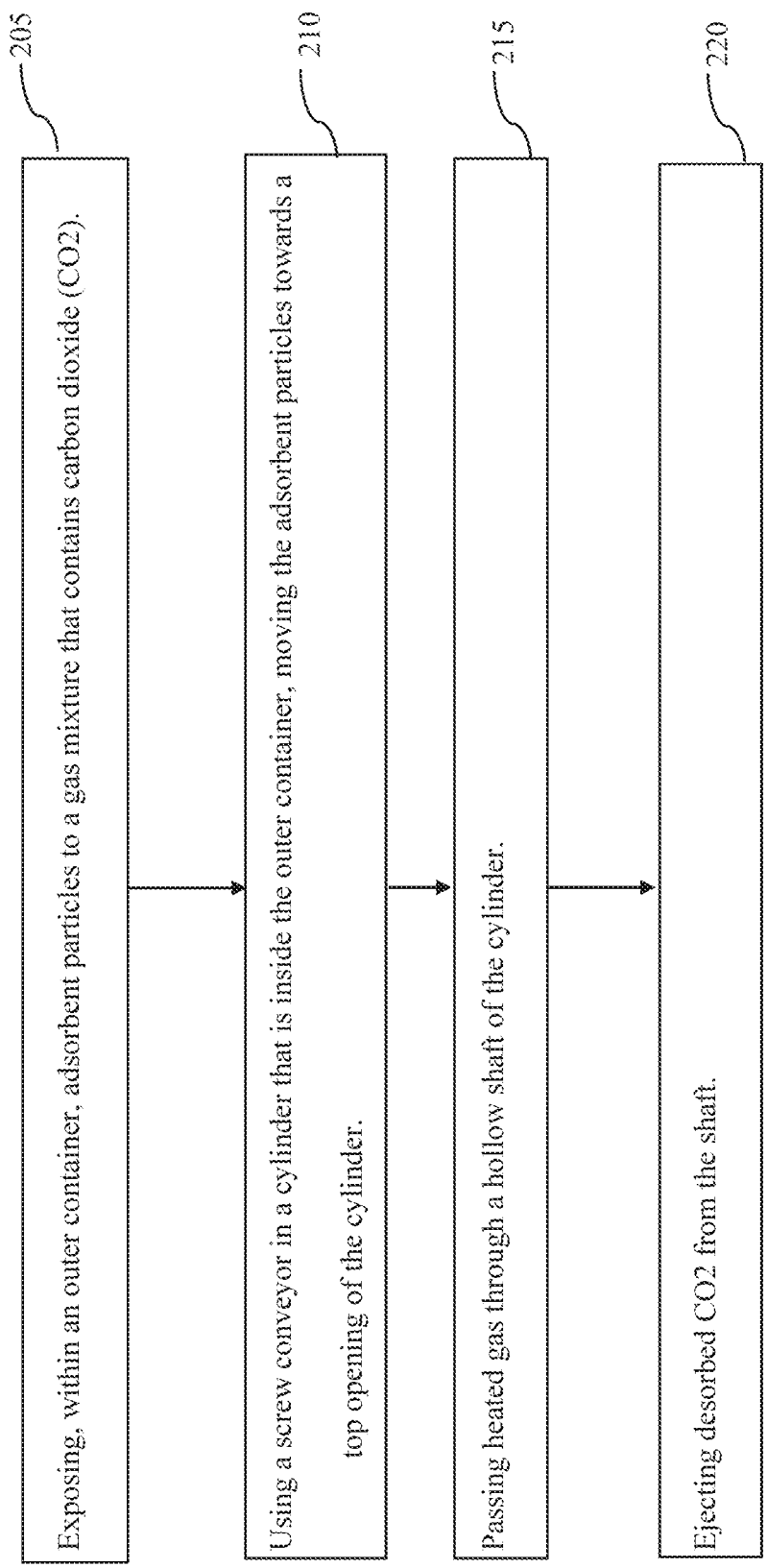
FIG. 2 is an example flow chart of a method for extracting $CO_2$ from gas.

FIG. 2 is an example flow chart of a method for extracting $CO_2$ from gas.

At stage 205, adsorbent particles are exposed to a gas mixture that contains $CO_2$. This exposure occurs in an outer container that acts as an adsorption section.

Particles that have a high surface area and are porous can adsorb $CO_2$. As one example, activated carbon particles are particles of carbon material that have been treated with oxygen to create a high surface area and high porosity. Activated carbon particles can adsorb $CO_2$. In some embodiments, carbon particles may be chosen as the adsorbent particles due at least in part to desirable selectivity of $CO_2$ over nitrogen, water, or other components of the gas mixture within the temperature operating range. Metal-organic framework (MOF) particles are made up of metal ions and organic ligands that create a highly porous, crystalline structure. MOF particles have a large surface area and tunable pore sizes, which make them effective at capturing $CO_2$. Silica particles are made of silicon dioxide ($SiO2$) that can adsorb moisture and other small molecules, including $CO_2$. Zeolite particles are made of porous minerals that have high surface areas and can trap $CO_2$ in their channels. Polymeric particles are made of polymers that have been designed to contain amine groups, which can chemically react with $CO_2$ to form stable complexes. One of the best adsorbent material for this kind of moving bed is alumina impregnated with $Na_2CO_3$ or $K_2CO_3$ while the cheapest is crusted stone chips. All possible adsorbent materials are not limited by the aforementioned examples.

The adsorbed particles can move to the bottom of the chamber, where they are picked up by a screw conveyor.

At stage 210, using a screw conveyor in a cylinder that is inside the outer container, the adsorbent particles can move upwards towards a top opening of the cylinder. The screw conveyor can have a porous screw that allows $CO_2$ to pass once it has been desorbed from the adsorbent particles.

At stage 215, heated gas can pass through a hollow shaft of the cylinder. The temperature difference can cause the $CO_2$ to desorb from the adsorbent particles.

Desorption is the process of removing the adsorbed molecules from an adsorbent particle. One way to desorb $CO_2$ from an adsorbent particle is by using heat. The desorption process is carried out in a separate unit from the adsorption unit and involves heating the adsorbent particle to a higher temperature, which causes the adsorbed $CO_2$ to desorb.

The system can use thermal swing adsorption (TSA), which involves cyclically heating and cooling the adsorbent particles to remove the adsorbed gas. In one example, the adsorbent particle is heated to a temperature that is higher than the temperature at which $CO_2$ adsorption occurs. This increases the kinetic energy of the $CO_2$ molecules, weakening the bond between the $CO_2$ molecules and the adsorbent surface.

The adsorbent particles are then cycled out the top of the screw conveyor, back into the adsorption chamber. There, they are cooled to a temperature that is suitable for $CO_2$ adsorption. The adsorption chamber remains ready to adsorb $CO_2$, and the cycle of adsorption, desorption, and cooling can be repeated.

At stage 220, the system ejects desorbed $CO_2$ from the shaft. The $CO_2$ passes into the shaft through holes in the screw and shaft.

Adsorbent Particles:

The current disclosure may be used with any type of adsorbent particles enabling $CO_2$ uptake. Such adsorbent particles may include zeolites, or activated carbons (also called porous carbons), alkalized alumina, known for their high surface areas and porosity. These materials physically adsorb $CO_2$ molecules, primarily through van der Waals forces. Adsorbents may also include chemical adsorbents, such as amine-functionalized solids, react chemically with carbon dioxide to form stable compounds, facilitating efficient capture. Types of adsorbent particles may also include Metal-Organic Frameworks (MOFs), a newer class of sorbents, having a highly customizable structure and exceptional porosity. These hybrid materials, composed of metal ions and organic linkers, can be tailored to enhance $CO_2$ affinity and selectivity. MOFs demonstrate superior $CO_2$ uptake capacities compared to traditional sorbents, especially at low pressures, making them ideal for post-combustion capture scenarios. Exemplary MOFs that can be used for $CO_2$ uptake include MOFs from the SIFSIX series, such as SIFSIX-1-Cu, SifSIX-2-Cu, SIFSIX-2-Cu-i, SIFSIX-3-Zn, et SIFSIX-3-Cu, and/or HKUST-1 and/or MIL-53(M), with M being a metal such as Fe, Cu or Al, and/or MIL-96 and/or UiO-66 and/or UiO-66-NH2.

In an embodiment, the adsorbent particles include a Metal-Organic Frameworks (MOFs) that includes several MOF crystals bound together, forming optionally a monolithic MOF. It represents an advanced form of MOF materials, distinct from its conventional powdered counterparts and designated as m-MOF in the following. Such m-MOFs are essentially solid, continuous structures, often exhibiting porous architecture, offering several advantages including reduced pressure drop relative to powdered counterparts, enhanced mechanical stability, improved scalability and/or handling. Such m-MOF may have a volume more important than a powdered MOF, for instance a volume higher than 0.1 $mm^3$, optionally 1 $cm^3$.

Other embodiments of the invention will be apparent to those skilled in the art from consideration of the specification and practice of the invention disclosed herein. It is understood that the control functionality can be carried out by a processor-enabled device. It is intended that the specification and examples be considered as exemplary only, with a true scope and spirit of the invention being indicated by the following claims.

What is claimed is:

1. A method for removing carbon dioxide from gas, comprising:
    exposing, within an outer container, adsorbent particles to a gas mixture that contains carbon dioxide ($CO_2$);
    using a screw conveyor in a cylinder that is inside the outer container, moving the adsorbent particles around a shaft towards a top opening of the cylinder;
    passing a heated gas through a hollow part of the shaft of the cylinder to heat the adsorbent particles;
    desorbing the $CO_2$ from the adsorbent particles; and
    ejecting the desorbed $CO_2$ from the hollow part of the shaft.

2. The method of claim 1, wherein the screw conveyor includes a flexible rubber edge at a screw intake, wherein a screw of the screw conveyor is flexible and rubber at a portion that contacts the screw intake.

3. The method of claim 1, comprising:
    filling a bottom portion of the outer container with a sealing liquid, wherein the screw conveyor raises the adsorbent particles into the cylinder from the sealing liquid; and
    cycling the sealing liquid through a sieve mesh positioned at an end of the screw conveyor in the bottom portion below a bottom opening of the cylinder.

4. The method of claim 1, wherein the screw conveyor comprises a hollow spiral attached to the hollow shaft, wherein the hollow spiral comprises a plurality of holes in fluid connection to the hollow part of the shaft.

5. The method of claim 1, wherein the cylinder includes a top opening, wherein the screw conveyor pushes the adsorbent particles out of the top opening into the outer container.

6. The method of claim 1, comprising outputting a $CO_2$-lean gas separated from the gas mixture to a heat exchanger, which returns the $CO_2$-lean gas as the heated gas through the hollow shaft.

7. The method of claim 1, wherein the adsorbent particles include a Metal-Organic Framework (MOF).

8. The method of claim 7, wherein the adsorbent particles include a MOF having one or more bonded MOF crystals.

9. The method of claim 8, wherein the adsorbent particles include a monolithic MOF.

10. The method of claim 1, wherein the adsorbent particles include a porous carbon, alkalized alumina, zeolite, or amine-functionalized sorbent.

11. A screw conveyor adsorption moving bed, comprising:
    an outer adsorption chamber;
    an inner desorption chamber within the outer adsorption chamber;
    a screw conveyor at least partially inside the inner desorption chamber, the screw conveyor including a spiral screw and a central shaft; and
    a gas input configured to receive a gas mixture that contains carbon dioxide ($CO_2$),
    wherein adsorbent particles in the outer adsorption chamber are configured to adsorb the $CO_2$ from the gas mixture,
    wherein the adsorbent particles are cycled on the screw conveyor, and
    wherein a hot gas is passed through the central shaft, causing desorption of the $CO_2$ from the adsorbent particles, and wherein the desorbed $CO_2$ is configured to exit the inner desorption chamber through the central shaft.

12. The screw conveyor adsorption moving bed of claim 11, wherein the spiral screw includes a plurality of holes.

13. The screw conveyor adsorption moving bed of claim 11, further comprising a gas outlet for $CO_2$-lean gas separated from the gas mixture, wherein the gas outlet is coupled to a heat exchanger that captures unused thermal energy from the inner desorption chamber for at least partial reuse in desorption.

14. The screw conveyor adsorption moving bed of claim 11, wherein the adsorption chamber is maintained at lower temperature than the desorption chamber.

15. The screw conveyor adsorption moving bed of claim 11, further comprising a bottom portion with a sealing liquid and a sieve mesh positioned below the screw conveyor, wherein the sealing liquid includes the adsorbent particles, and the sealing liquid is recirculated through the sieve mesh that substantially prevents recirculation of the adsorbent particles.

16. The screw conveyor adsorption moving bed of claim 15, comprising a pump and a powder filter coupled to the bottom portion, wherein the pump is configured to circulate the sealing liquid.

17. The screw conveyor adsorption moving bed of claim 11, wherein the adsorption chamber is configured to move the gas mixture up and to move the adsorbent particles down, wherein the desorption chamber is configured to move the adsorbent particles up and the desorbed $CO_2$ down.

18. The screw conveyor adsorption moving bed of claim 11, wherein the adsorbent particles include a Metal-Organic Framework (MOF).

19. The screw conveyor adsorption moving bed of claim 18, wherein the adsorbent particles include a MOF having one or more bonded MOF crystals.

20. The screw conveyor adsorption moving bed of claim 11, wherein the adsorbent particles include a porous carbon, alkalized alumina, zeolite, or amine-functionalized sorbent.

* * * * *